(12) United States Patent
Cox et al.

(10) Patent No.: US 7,624,431 B2
(45) Date of Patent: Nov. 24, 2009

(54) 802.1X AUTHENTICATION TECHNIQUE FOR SHARED MEDIA

(75) Inventors: Brian Francis Cox, Redwood City, CA (US); Bruce McMurdo, San Jose, CA (US); Venkateswara Rao Yarlagadda, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 597 days.

(21) Appl. No.: 10/728,302

(22) Filed: Dec. 4, 2003

(65) Prior Publication Data

US 2005/0125692 A1 Jun. 9, 2005

(51) Int. Cl.
*G06F 7/04* (2006.01)
*H04L 9/32* (2006.01)
*H04K 1/00* (2006.01)

(52) U.S. Cl. .............................. 726/4; 713/170; 380/270
(58) Field of Classification Search ................. 380/270; 726/4; 713/176
See application file for complete search history.

(56) References Cited

U.S. PATENT DOCUMENTS

| | | | | |
|---|---|---|---|---|
| 6,891,819 B1* | 5/2005 | Inoue et al. | ................. | 370/338 |
| 6,990,592 B2* | 1/2006 | Richmond et al. | ............ | 726/15 |
| 2003/0152067 A1* | 8/2003 | Richmond et al. | .......... | 370/352 |
| 2003/0154380 A1* | 8/2003 | Richmond et al. | .......... | 713/182 |
| 2003/0217122 A1* | 11/2003 | Roese et al. | ................ | 709/219 |
| 2004/0073793 A1* | 4/2004 | Takeda | ........................ | 713/168 |
| 2004/0158735 A1* | 8/2004 | Roese | ......................... | 713/200 |
| 2004/0172559 A1* | 9/2004 | Luo et al. | .................... | 713/201 |
| 2004/0208151 A1* | 10/2004 | Haverinen et al. | .......... | 370/338 |
| 2005/0055570 A1* | 3/2005 | Kwan et al. | ................. | 713/201 |
| 2005/0080921 A1* | 4/2005 | Lu | .............................. | 709/237 |
| 2005/0111466 A1* | 5/2005 | Kappes et al. | .............. | 370/400 |
| 2005/0177865 A1* | 8/2005 | Ng et al. | ........................ | 726/3 |
| 2006/0277187 A1* | 12/2006 | Roese et al. | ................... | 707/9 |

OTHER PUBLICATIONS

Radia Perlman, Interconnections, Second Edition: Bridges, Routers, Switches, and Internetworking Protocols, Addison-Wesley Longman, Inc., Chapter 1, pp. 1-17, Jan. 2000.
LAN/MAN Standards Committee of the IEEE Computer Society, IEEE Standard for Local and Metropolitan Area Networks: Port-Based Network Access Control, IEEE Std 802.1X-2001, American National Standards Institute, pp. 1-134, Oct. 25, 2001.

(Continued)

*Primary Examiner*—Christian LaForgia
(74) *Attorney, Agent, or Firm*—Cesari and McKenna, LLP

(57) ABSTRACT

The present invention provides a technique for securely implementing port-based authentication on a shared media port in an intermediate node, such as a router. To that end, the invention provides enhanced port-based network access control that includes client-based control at the shared media port. Unlike previous implementations, the port does not permit multiple client nodes to access a trusted subnetwork as soon as a user at any one of those nodes is authenticated by the subnetwork. Instead, port-based authentication is performed for every client node that attempts to access the trusted subnetwork through the shared media port. As such, access to the trusted subnetwork is not compromised by unauthenticated client nodes that "piggy-back" over the shared media port after a user at another client node has been authenticated by the trusted subnetwork.

32 Claims, 12 Drawing Sheets

OTHER PUBLICATIONS

L. Blunk et al., PPP Extensible Authentication Protocol (EAP), RFC 2284, Network Working Group, pp. 1-15, Mar. 1998.

LAN/MAN Standards Committee, IEEE Standard for Local and Metropolitan Area Networks: Overview and Architecture, IEEE Standard 802-2001, IEEE Computer Society, pp. 1-36, Mar. 8, 2002.

C. Rigney et al., Radius Extensions, RFC 2869, Network Working Group, pp. 1-47, Jun. 2000.

D. Harrington, et al., An Architecture for Describing SNMP Management Frameworks, RFC 2571, Standards Track, Network Working Group, pp. 1-62, Apr. 1999.

Funk Software, Inc., Architecting Your 802.1x-Based WLAN Deployment: Using Odyssey and Steel Belted Radius, White Paper, pp. 1-12, Oct. 2002.

David C. Plummer, An Ethernet Address Resolution Protocol or Converting Network Protocol Addressess to 48 bit Ethernet Address for Transmission on Ethernet Hardware, RFC 826, Network Working Group, Nov. 1982.

Congdon, Paul, IEEE 802.1X Overview: Port Based Network Access Control, IEEE Plenary Meeting, Albuquerque, New Mexico, Mar. 2000.

* cited by examiner

| MAC ADDRESS 510 | SUBINTERFACE 520 | AUTHENTICATION STATE 530 |
|---|---|---|
| MAC 1 | TRUSTED | AUTHENTICATED |
| MAC 2 | TRUSTED | AUTHENTICATED |
| ... | ... | ... |

802.1X AUTHENTICATION TECHNIQUE FOR SHARED MEDIA

FIELD OF THE INVENTION

This invention relates generally to network communications, and, more specifically, to a technique for controlling network communications through a shared media port in an intermediate network node.

BACKGROUND OF THE INVENTION

A computer network is a geographically distributed collection of interconnected subnetworks for transporting data between nodes, such as computers. The network's topology is defined by an arrangement of client nodes that communicate with one another, typically through one or more intermediate nodes. As used herein, a client node is an endstation node that is configured to originate or terminate communications over the network. In contrast, an intermediate node is a network node that facilitates routing data between client nodes. Communications between nodes are typically effected by exchanging discrete packets of data according to predefined protocols. In this context, a protocol consists of a set of rules defining how the nodes interact with each other.

Each data packet typically comprises "payload" data prepended ("encapsulated") by at least one network header formatted in accordance with a network communication protocol. The network headers include information that enables the client nodes and intermediate nodes to efficiently route the packet through the computer network. Often, a packet's network headers include at least a data-link (layer 2) header and an internetwork (layer 3) header, as described by the Open Systems Interconnection (OSI) Reference Model. The OSI Reference Model is generally described in more detail in Section 1.1 of the reference book entitled *Interconnections Second Edition*, by Radia Perlman, published September 1999, which is hereby incorporated by reference as though fully set forth herein.

The data-link header provides information for transmitting the packet over a particular physical link (i.e., a communication medium), such as a point-to-point link, Ethernet link, wireless link, optical link, etc. To that end, the data-link header may specify a pair of "source" and "destination" network interfaces that are connected by the physical link. A network interface contains the mechanical, electrical and signaling circuitry and logic used to couple a network node to one or more physical links. In general, a network interface may contain one or more ports that connect to different communication mediums. As used herein, a port is a physical interface through which a physical link is attached to a network interface. A network interface is often associated with a hardware-specific address, known as a media access control (MAC) address. Accordingly, the source and destination network interfaces in the data-link header are typically stored as source and destination MAC addresses. The data-link header may also store flow control, frame synchronization and error checking information used to manage data transmissions over the physical link.

The internetwork header provides information defining the packet's logical path (or "virtual circuit") through the computer network. Notably, the path may span multiple physical links. The internetwork header may be formatted according to the Internet Protocol (IP), which specifies IP addresses of both a source and destination node at the end points of the logical path. Thus, the packet may "hop" from node to node along its logical path until it reaches the client node assigned to the destination IP address stored in the packet's internetwork header. After each hop, the source and destination MAC addresses in the packet's data-link header may be updated, as necessary. However, the source and destination IP addresses typically remain unchanged as the packet is transferred from link to link in the network.

Client nodes may be configured to communicate over various types of networks, ranging from local area networks (LANs) to wide area networks (WANs). LANs typically connect client nodes over dedicated private communications links located in the same general physical location, such as in a home or an office building. WANs typically connect large numbers of geographically dispersed nodes over long-distance communications links, such as common carrier telephone lines. The Internet is an example of a WAN that connects disparate networks throughout the world, providing global communication between nodes contained in various networks.

A plurality of LANs and WANs may be interconnected by an intermediate node, such as a router or switch, to extend the effective "size" of the computer network and increase the number of communicating nodes. For example, one or more intermediate nodes may be employed to extend a LAN belonging to a particular organization (or "enterprise") beyond the geographic boundaries of that organization. The intermediate nodes enable authorized telecommuters, e.g., working from a home office, to remotely connect to the enterprise LAN. In an illustrative case, the telecommuter establishes a communication session with a local intermediate node, which in turn establishes a communication session with a remote intermediate node in the enterprise network. Once connected in this manner, the telecommuter can access resources and services provided in the enterprise network as if he/she were physically present in the organization.

Because the local and remote intermediate nodes may be coupled over an untrusted public network, such as the Internet, the nodes may be configured to communicate using a more secure, "trusted" subnetwork implemented over the public network. The trusted subnetwork employs cryptographically secure communications sent over the larger, "untrusted" public network. In effect, the trusted subnetwork functions as a virtual "tunnel" that protects data communicated between the intermediate nodes. For instance, a virtual private network (VPN) may be employed by the intermediate nodes to ensure the privacy of their communicated data. To that end, data packets may be encrypted when they "enter" the VPN tunnel at one of the intermediate nodes, and decrypted when they "exit" at the other intermediate node. Conventional tunneling protocols, such as the Layer 2 Tunneling Protocol (LT2P), Point to Point Tunneling Protocol (PPTP) and the IP Security (IPSec) Protocol are known in the art for encapsulating communications through the VPN tunnel.

Although the VPN tunnel may be constructed to securely transfer data over an untrusted network, a remote user (i.e., a telecommuter) typically should be authenticated before being granted access to the tunnel. By requiring user authentication in this way, the enterprise network is protected from unauthorized users gaining access to the enterprise's VPN tunnel (i.e., "enterprise VPN"). User authentication is typically implemented at an intermediate-node port coupled to the enterprise VPN. The port assumes one of two possible states: "open" or "closed." Initially, the port's state is closed, thereby preventing client-node access to the enterprise VPN. However, after a user is authenticated at the port, the port changes to an open state. The open port enables the authenticated user to access the enterprise VPN. Besides providing access to the VPN tunnel, the open port may also provide other specialized services, such as enhanced quality of service, that are not available through the port in its closed state.

A popular technique for implementing this type of conventional port-based security is described in The Institute of Electrical and Electronics Engineers' (IEEE) standard IEEE Std 802.1X-2001 entitled *Port-based Network Access Control*, published July 2001, which is hereby incorporated by reference as though fully set forth herein. In this standard, a client node executes a "supplicant" port access entity (PAE) at a client-node port, and an intermediate node executes an "authenticator" PAE at an intermediate-node port coupled to the client-node port. The supplicant and authenticator PAEs are configured to transmit and receive data packets formatted in accordance with the 802.1X standard.

The intermediate node's port is initially in an uncontrolled state (i.e., a "closed state), whereby all client-node communications at the port are directed to the authenticator PAE. The supplicant PAE at the client node generates an 802.1X authentication request to change the intermediate node's port to a controlled state (i.e., an "open" state). As per the 802.1X standard, the request is formatted according to the Extensible Authentication Protocol (EAP) and encapsulated in a conventional IEEE 802 data frame. The EAP protocol is described in more detail in Request for Comments (RFC) 2284 entitled *PPP Extensible Authentication Protocol (EAP)*, published March 1998, and the IEEE 802 standard is generally described in IEEE Std 802-2001 entitled 802 *IEEE Standard for Local and Metropolitan Area Networks: Overview and Architecture*, published February 2002, both of which are hereby incorporated by reference as though fully set forth herein. Advantageously, the EAP protocol is a generic protocol capable of supporting various different authentication techniques. Thus, the supplicant PAE may generate the 802.1X authentication request in accordance with any authentication method consistent with the EAP protocol. When the client node and intermediate node are connected via a shared LAN segment, the supplicant PAE formats the request as an EAP over LAN (EAPOL) packet and forwards it to the intermediate node.

At the intermediate node, the EAPOL packet is received by the authenticator PAE, which processes and forwards the request to an appropriate authentication service, such as a Remote Authentication Dial-In User Service (RADIUS). If necessary, the request may be reformatted by the authenticator PAE, e.g., in accordance with an EAP over RADIUS protocol, before being forwarded to the authentication service. The EAP over RADIUS protocol is described in more detail in RFC 2869 entitled *RADIUS Extensions*, published June 2000, which is hereby incorporated by reference as though set forth fully herein.

Upon receiving the request, the authentication service provides authentication, authorization and accounting (AAA) functions to determine whether a user at the client node may be authenticated at the intermediate node's port. The AAA procedures are performed in accordance with the authentication method specified by the user's EAP request. Accordingly, the AAA procedures may require that a sequence of challenge response exchanges be performed between the authentication service and the client node. Upon completion of these procedures, the authentication service notifies the authenticator PAE of the user's authentication state. If the user is authenticated, then the authenticator PAE changes the intermediate-node port's state to controlled, thereby enabling the user to access the enterprise VPN and other intermediate-node services. Otherwise, the intermediate node's port remains in an uncontrolled state. This 802.1X authentication process is typically repeated periodically to verify that the user's authentication state at the intermediate-node port does not change, e.g., from authenticated to unauthenticated.

While the above-noted 802.1X authentication procedure works well for intermediate-node ports coupled to individual client nodes, it does not scale well when a plurality of client nodes is coupled to a shared media port in the intermediate node. As used herein, a shared media port is a physical interface that connects a network interface to one or more physical links coupled to a plurality of other network interfaces. For example, the shared media port may include an integrated hub or switch through which the port is connected to a plurality of remote network interfaces. Alternatively, the port may be connected to a "downstream" hub or switch that couples the port to a plurality of remote network interfaces. By way of example, a telecommuter working from home may access an enterprise VPN through a shared media port in a "home" (i.e., local) intermediate node. At the same time, one or more family members working from different computers in the home may establish separate network connections through the same shared media port.

Network security problems often arise when both authorized and unauthorized users communicate through a shared media port that is configured to perform port-based network access control, such as 802.1X authentication. As noted, the shared media port transitions from an unauthorized to an authorized state once a user is authenticated at the port. Consequently, unauthenticated users at client nodes coupled to the shared media port may gain unauthorized access to the intermediate node's services as soon as a user is authenticated at another client node coupled to that port. In this situation, network security may be compromised by the unauthenticated users coupled to the authorized port. This problem may be exacerbated when an access point (AP) is connected to the shared media port, since the AP can serve as a gateway for a potentially large number of unauthenticated users as wireless client nodes. Unfortunately, the IEEE 802.1X standard does not address the possibility of such security breaches at shared media ports.

Previously, the above-noted security problems have been addressed by employing network access control within client nodes coupled to the shared media port. The client nodes are configured to determine whether their respective users are authorized to access a trusted subnetwork (e.g., an enterprise VPN) through the shared media port, even when the port is already in an authorized state. For example, an organization may install a list of allowed client nodes, so only those client nodes on the list are permitted to access the organization's enterprise VPN. Although this solution essentially extends conventional port-based network access control for client nodes connected to a shared media port, the solution has a number of significant drawbacks.

First, maintaining and distributing updated lists of authorized client nodes is an arduous task for large organizations. In the event that the organization has issued a large number of client nodes, e.g., to its telecommuters, the distribution of updated lists may be extremely difficult to deploy in a timely manner. Further, because authorized client nodes may join and leave the organization at relatively high frequencies, the time and resources consumed while maintaining such lists may be prohibitive. Second, because access control to the enterprise VPN is implemented in a potentially large number of client nodes, each client node is a possible point at which the VPN's network security may be compromised. Thus, configuring and maintaining security measures in a large number of client nodes also may consume excessive time and resources. In addition, allowing access based upon the client node does not authenticate the user on that node. That is, an authorized client node may be controlled by an unauthorized user.

It is therefore desirable to provide a more efficient and secure authentication technique at shared media ports. The technique should be compatible with conventional portbased security, such as 802.1X authentication, and should provide as high a level of network security. Further, the technique should not consume excessive time and resources to deploy to a large number of client nodes. It is also desirable that the technique not rely on security measures implemented in individual client nodes coupled to the shared media port.

SUMMARY OF THE INVENTION

The present invention provides a technique for securely implementing port-based authentication on a shared media port in an intermediate node, such as a router. To that end, the invention provides enhanced port-based network access control that includes client-based control at the shared media port. Unlike previous implementations, the port does not permit multiple client nodes to access a trusted subnetwork as soon as a user at any one of those nodes is authenticated by the subnetwork. Instead, port-based authentication is performed for every client node that attempts to access the trusted subnetwork through the shared media port. As such, access to the trusted subnetwork is not compromised by unauthenticated client nodes that "piggy-back" over the shared media port after a user at another client node has been authenticated by the trusted subnetwork.

In accordance with an illustrative embodiment, the technique enhances port-based network access control specified by the IEEE 802.1X authentication standard to partition the shared media port into a plurality of logical subinterfaces. Each subinterface is dedicated to providing client nodes with access to a respective network or subnetwork. For example, a first client node may access a trusted subnetwork, such as a virtual private network, through a first subinterface and a second client node can access an untrusted network, such as the Internet, through a second subinterface implemented on the same port. In this case, the first and second subinterfaces are configured differently for the trusted subnetwork and untrusted network, respectively. For instance, the first and second subinterfaces may be associated with different Internet Protocol (IP) addresses or virtual local area network identifiers that distinguish the subinterfaces from one another.

Further to the illustrative embodiment, a media access control (MAC) filter is employed at the shared media port to determine which client nodes are permitted access to each of the port's logical subinterfaces. This aspect of the invention ensures that even when the port employs 802.1X port-based network access, the MAC filter limits network access over the port's subinterfaces on a client-by-client basis. Specifically, the filter stores a list of client-node MAC addresses, wherein each address is associated with a respective subinterface and an "authentication state" (e.g., authenticated, unauthenticated or unknown). Based on the value of a client node's MAC address, the intermediate network node can use the MAC filter to identify which (if any) logical subinterfaces are accessible to the client node and whether the client node is authenticated to communicate over those subinterfaces.

In operation, a MAC filter is created "dynamically" at each shared media port of the intermediate network node; that is, the MAC filter is not created at the shared media port until a client node sends an 802.1X authentication request to one of the port's logical subinterfaces. In response to receiving the request, an operating system executing in the intermediate network node automatically creates the MAC filter at the shared media port. The authentication request includes, among other things, the client node's MAC address, which is "learned" by the MAC filter. In this context, the filter learns the MAC address by storing and associating it with the subinterface at which the 802.1X request was received. The request is then forwarded from the shared media port to an appropriate authentication service which returns an indication of the client node's authentication state for accessing the subinterface's associated network or subnetwork. The client node's authentication state is stored in the MAC filter and may be returned to the client node. As subsequent 802.1X requests are received at the shared media port, the MAC filter is updated to include new client-node MAC addresses and/or authentication states. Illustratively, if a client node fails to authenticate on a subinterface a predetermined number of times (e.g., 2), an "alarm" message is transmitted over the subinterface's associated network or subnetwork to indicate that the client node may be attempting to compromise the network.

Data packets received from a client node are either "dropped" by a logical subinterface or redirected to a more appropriate subinterface when the MAC filter indicates that the client node is not authenticated to communicate on that subinterface. When the packets are redirected to a more appropriate subinterface, authenticated users can access the trusted subnetwork and unauthenticated users can access an alternate subnetwork, e.g., which may grant them access to the Internet. In this manner, the shared media port can be shared securely between authenticated and unauthenticated users. An example of this type of use would be that of a teleworker having secure access to an enterprise network, whilst a family member of the teleworker uses the same intermediate node to access the Internet.

In addition, data packets received over a network or subnetwork are dropped if they are addressed to a client node that is not authenticated on that network or subnetwork. In the illustrative embodiment, one or more routing tables in the intermediate network node are configured to correlate client-node IP addresses with subinterfaces in the intermediate network node. Accordingly, after a received data packet is associated with a subinterface by a routing table, the MAC filter associated with that subinterface may be used to determine whether the addressed client node is authenticated to receive the data packet. If so, the packet is forwarded to the client node; otherwise it is dropped at the subinterface.

Further still to the illustrative embodiment, an IP filter may be employed at the shared media port. The IP filter stores a list of IP addresses corresponding to client nodes connected to the port. According to this embodiment, the IP filter cooperates with the MAC filter to essentially override certain access restrictions provided by the MAC filter. That is, while the MAC filter at the shared media port may not permit client nodes authenticated on different subinterfaces to communicate with one another, the IP filter may. As a result, client nodes whose IP addresses are stored in the IP filter may communicate with one another over the shared media port, regardless of their authentication states stored in the MAC filter.

Advantageously, the inventive technique increases network-access security over a shared media port that is configured to perform port-based (e.g., 802.1X) authentication. The technique blocks unauthorized (i.e., "rogue") client nodes from accessing trusted subnetworks through the shared media port, even after a previous client node has authenticated through that port. Although access to a trusted subnetwork over a subinterface may be limited to only authenticated client nodes, the technique still allows unauthenticated client nodes to communicate over the share media port's other subinterfaces. In this manner, secure access to trusted subnetworks is implemented at the shared media port rather than at each client node, as previously done.

BRIEF DESCRIPTION OF THE DRAWINGS

The above and further advantages of the invention may be better understood by referring to the following description in conjunction with the accompanying drawings in which like reference numerals indicate identically or functionally similar elements, of which:

FIG. 5 is a schematic block diagram of an exemplary media access control (MAC) filter that may be employed at FIG. 3's shared media port;

DETAILED DESCRIPTION OF ILLUSTRATIVE EMBODIMENTS

A. Network Environment

Figure 1:
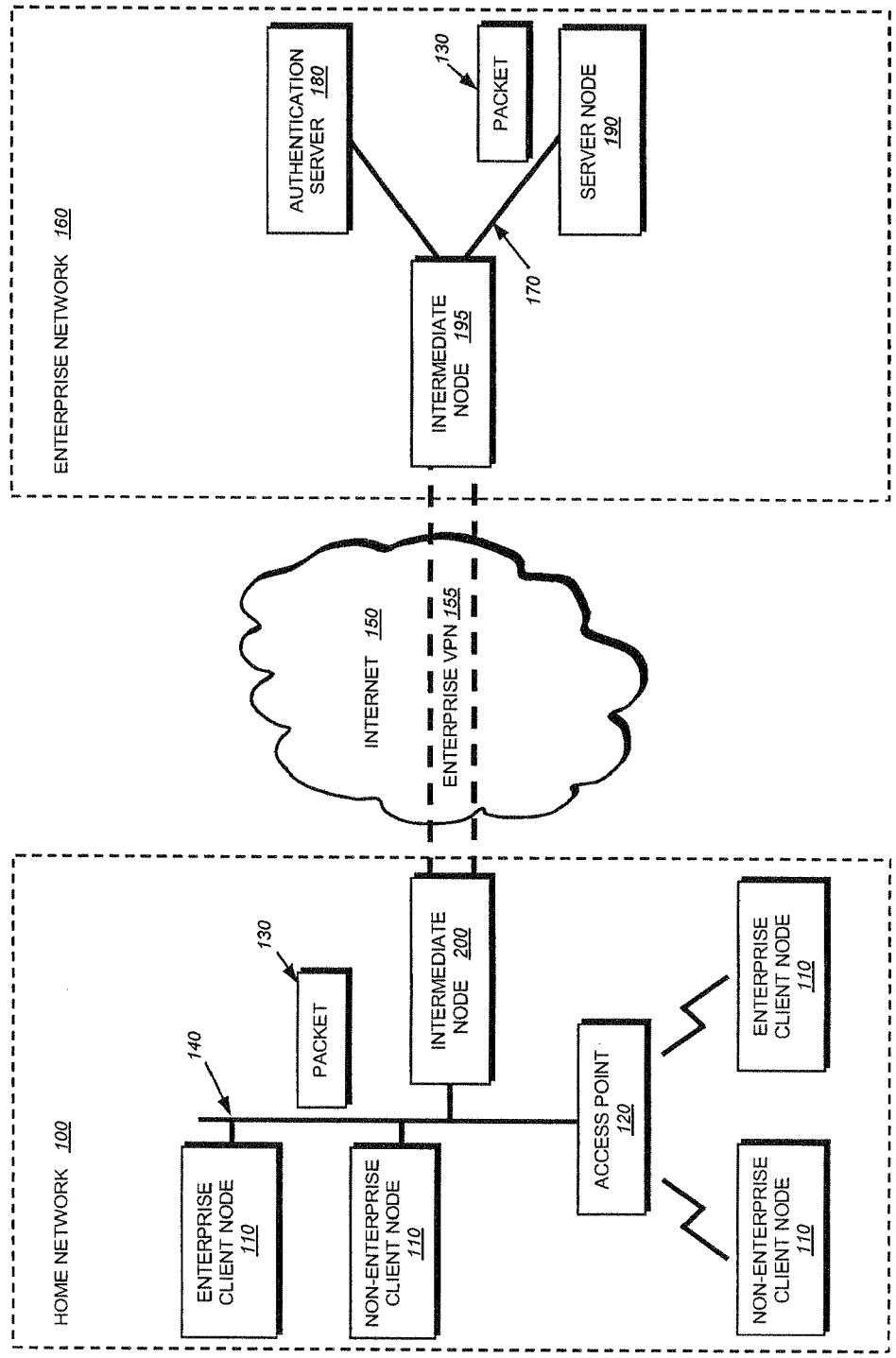
FIG. 1 is a schematic block diagram of an exemplary network configuration in which an intermediate node in a home network is coupled to an intermediate node in an enterprise network by a virtual private network.

The present invention provides a technique for securely implementing port-based authentication on a shared media port in an intermediate node, such as a router, switch, bridge, etc. FIG. 1 illustrates an exemplary network configuration including an intermediate node 200 that may be employed in accordance with the inventive technique. Specifically, a "home" computer network 100 is coupled to a remote "enterprise" network 160 through a virtual private network 155 (VPN) established at the intermediate node 200. The VPN effectively creates a secure communication "tunnel" through an untrusted network, such as the Internet 150. In this context, the enterprise network is implemented within an organization, such as a business. On the other hand, the home network is implemented by a telecommuter, or the like, who is permitted to remotely access resources in the enterprise network.

The home network 100 may include a plurality of interconnected client nodes 110, some being permitted to access the enterprise VPN 155 (i.e., "enterprise" client nodes) and others not (i.e., "non-enterprise" client nodes). The client nodes may be computer systems or other devices that originate and/or terminate communications over a home local area network (LAN) 140. For instance, a client node 110 may be a personal computer, a network printer, an Internet Protocol (IP) phone (or other voice-over-IP device), and so forth. One or more of the client nodes 110 may access the home LAN 140 through an access point (AP) 120. That is, wireless client nodes communicate data packets 130 to the AP, which in turn reformats and transmits the packets over the LAN 140. Each packet 130 transferred over the home LAN typically includes both data-link (layer2) and internetwork (layer-3) headers that define the packet's path through the network.

A data packet 130 may be transmitted from a client node 110 to the intermediate node 200. After receiving the packet, the intermediate node 200 may process the packet to determine whether the packet's originating (i.e., "source") client node is authenticated to communicate over the enterprise VPN 155. If so, the packet may be reformatted in accordance with a tunnel protocol used within the enterprise VPN. The reformatted packet 130 is then forwarded to a remote intermediate node 195 at the other "end" of the VPN tunnel.

The intermediate node 195 is coupled to other network nodes in the enterprise network 160 by an enterprise LAN 170. For example, the LAN 170 connects the intermediate node 195 to an authentication server 180 and a server node 190. After receiving the packet 130 from the enterprise VPN 155, the intermediate node 195 forwards the packet over the LAN 170 to the packet's addressed network node. This process may be reversed when a network node in the enterprise network 160 sends a data packet 130 to a client node 110 in the home network 100. More specifically, the packet may be forwarded over the enterprise LAN 170 to the intermediate node 195, through the VPN 155 to the intermediate node 200, and over the home LAN 140 to the client node 110.

Figure 2:
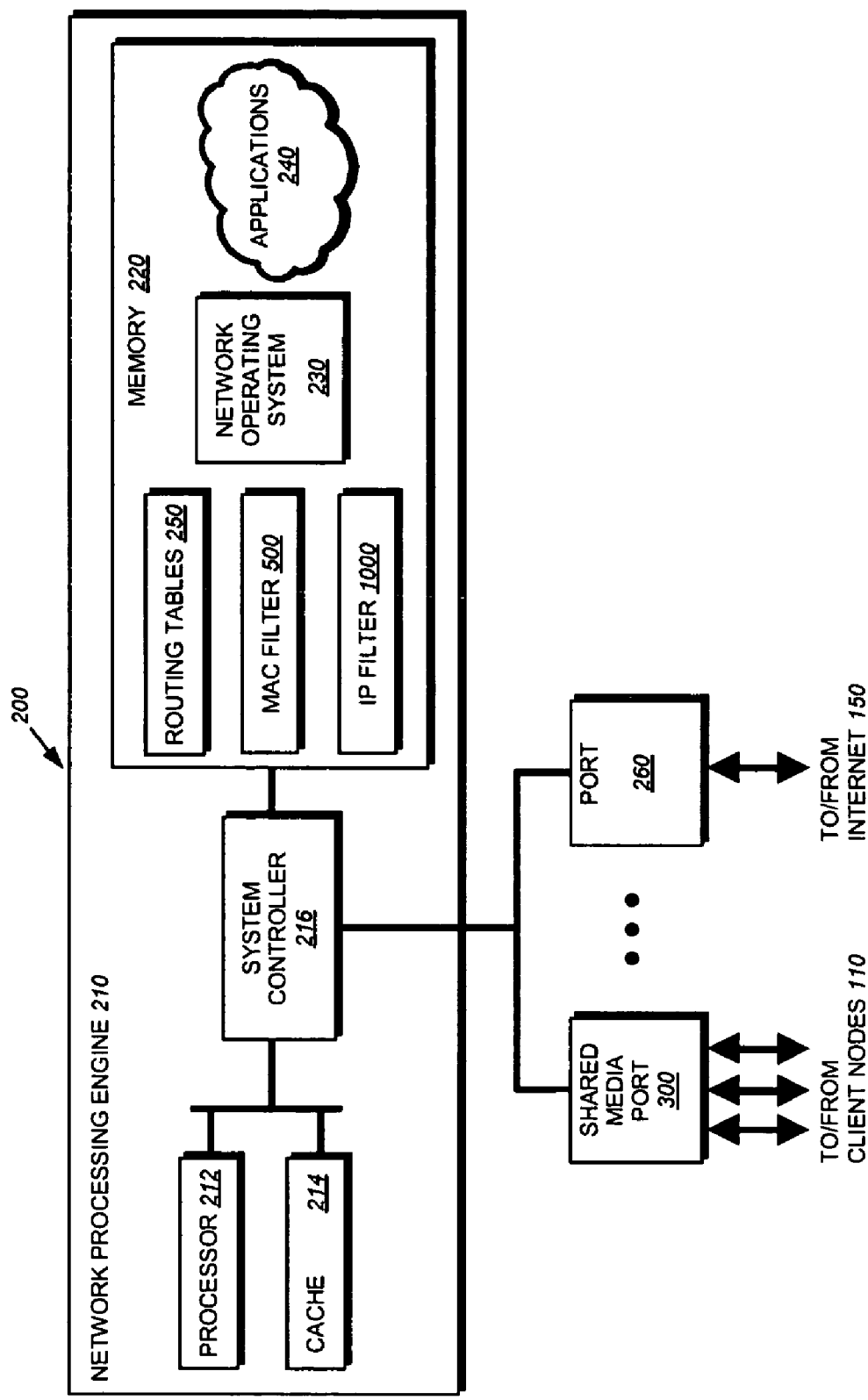
FIG. 2 is a schematic block diagram of an illustrative intermediate node that may be employed in FIG. 1's home network.

FIG. 2 is a schematic block diagram of the intermediate node 200. The intermediate node implements a modular and scalable architecture that facilitates use of the node as an edge device, e.g., within the home network 100. For example, the node 200 may be implemented as a 1700 series router available from Cisco Systems, Inc. Illustratively, the intermediate node 200 comprises a network processing engine 210 coupled to a plurality of ports, such as shared media port 300 and port 260.

The ports 300 and 260 are typically resident on one or more network interface cards (NIC) in the intermediate node 200, wherein each NIC is assigned a unique media access control (MAC) address. The port 260 comprises the mechanical, electrical and signaling circuitry that enables the intermediate node 200 to communicate over a, e.g., point-to-point link, Ethernet link, optical link, wireless link or other physical link, coupled to the Internet 150. In contrast, the shared media port 300 provides the mechanical, electrical and signaling circuitry that enables the node 200 to communicate over one or more physical links coupled to a plurality of client nodes 110. For example, the port 300 may include an integrated hub or switch or may be attached to a "downstream" hub or switch in the home LAN 140. Each port 300 and 260 is typically associated with a different network configuration. For instance, the ports may be associated with different IP configurations, virtual local area network (VLAN) configurations, authentication protocols and so forth.

The network processing engine 210 is a processor-based system comprising functionality incorporated within a typical intermediate node. That is, the engine comprises a processor 212 (and cache 214) coupled to a system memory 220 via a system controller 216. The memory 220 may comprise dynamic random access memory (DRAM) and/or synchronous DRAM (SDRAM) storage locations addressable by the processor 212 for storing software applications 240, such as port access entities (PAE), and data structures, such as routing tables 250, MAC filters 500, IP filters 1000, etc. A network operating system 230, portions of which are typically resident in the memory 220 and executed by the processor 212, functionally organizes the intermediate node 200 by, inter alia, invoking network operations in support of software processes executing on the intermediate node. The IOS™ operating system by Cisco Systems, Inc. is one example of a network operating system 230. It will be apparent to those skilled in the art that other memory means, including various computer-readable media, may be used for storing and executing program instructions pertaining to the operation of the intermediate node.

B. Enhanced Port-Based Authentication

In accordance with an illustrative embodiment, the shared media port may be partitioned into a plurality of logical subinterfaces. Each subinterface is dedicated to providing client nodes with access to a respective network or subnetwork. Further to the illustrative embodiment, a media access control (MAC) filter is employed at the shared media port to determine which client nodes are permitted access to each of the port's logical subinterfaces. This aspect of the invention ensures that even when the port employs port-based network access control, such as 802.1X authentication, the MAC filter limits network access over the port's subinterfaces on a client-by-client basis.

Figure 3:
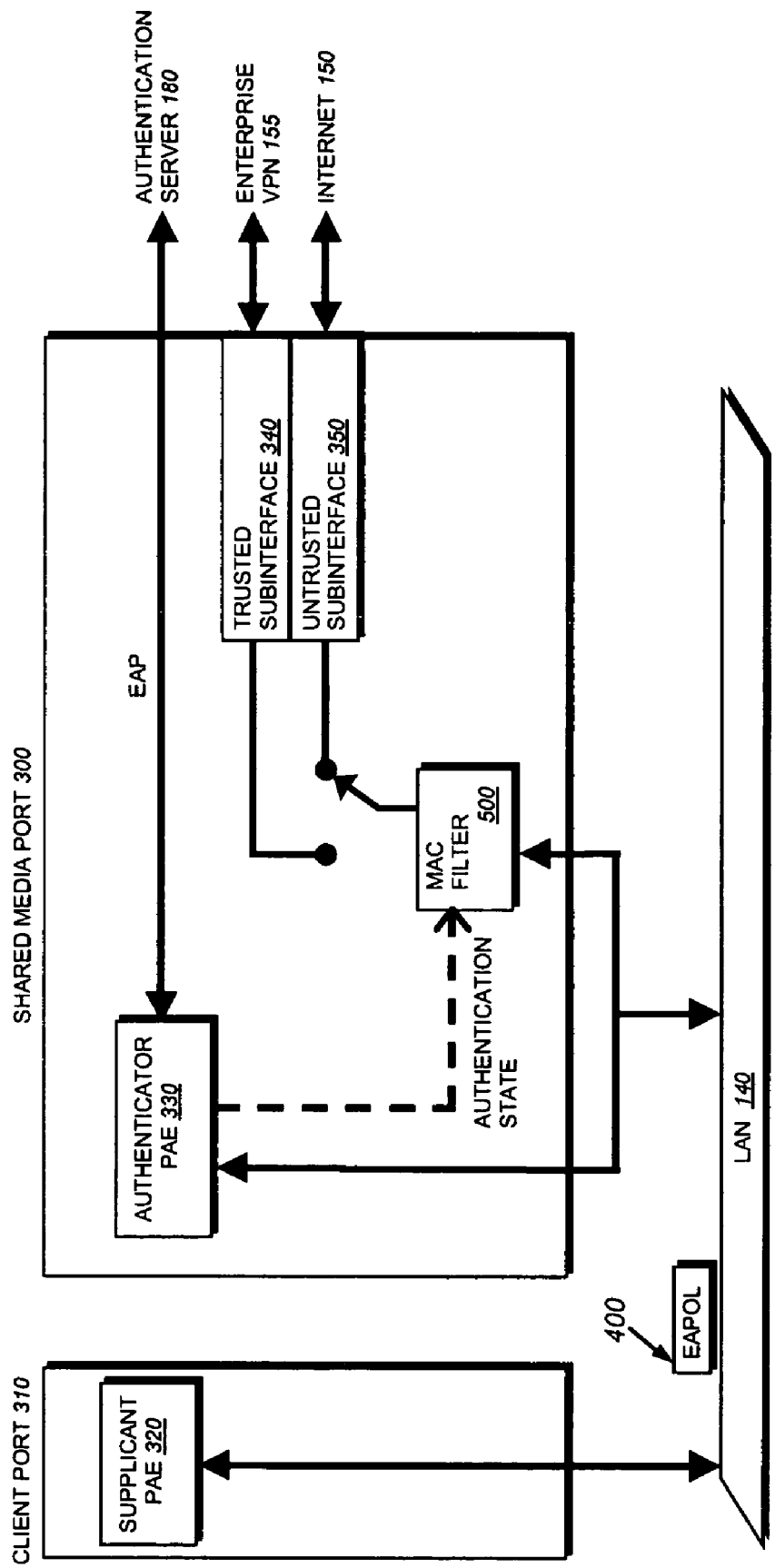
FIG. 3 is a schematic block diagram of a client node coupled to an exemplary shared media port that may be used to implement the present invention in FIG. 2's intermediate node.

FIG. 3 illustrates intermediate node 200's shared media port 300. The shared media port is partitioned into two exemplary logical subinterfaces: trusted subinterface 340 and untrusted subinterface 350. Each subinterface is associated with a different network or subnetwork that may be accessed through the shared media port. For example, communications addressed to the trusted subinterface 340 are directed to the enterprise VPN 155; communications addressed to the untrusted subinterface 350 are directed to the Internet 150. Although only two logical subinterfaces 340 and 350 are illustrated, those skilled in the art will appreciate that the shared media port 300 may be partitioned into an arbitrary number of different trusted (i.e., limited to authorized users and devices) and untrusted subinterfaces.

Each logical subinterface 340 and 350 is associated with a different network configuration corresponding to its respective network or subnetwork. More specifically, the subinterfaces may be associated with different IP address spaces (e.g., assigned in accordance with a dynamic host configuration protocol), VLAN identifiers, etc. that differentiate one subinterface from the other. For example, a data packet received at the shared media port 300 may be associated with the trusted subinterface 340 if the packet is addressed to a network node in the enterprise network 160 and the packet's sender is authorized to access the addressed node. More generally, the packet may be associated with the trusted subinterface in various ways, e.g., based on the packet's destination IP address, the packet's source MAC address, the network interface on which the packet was received, etc. If the packet is not associated with the trusted subinterface 340, the received packet is instead associated with the untrusted subinterface 350.

In the illustrative embodiment, the shared media port 300 is configured to implement IEEE 802.1X port-based network access control. As shown, the shared media port is coupled over the home LAN 140 to a port 310 in a client node 110. The client node executes a supplicant PAE 320 associated with the client-node port 310, and the intermediate node 200 executes an authenticator PAE 330 associated with the shared media port 300. When the client node attempts to be authenticated at the shared media port, e.g., to gain access to the trusted subinterface 340, the supplicant PAE 320 transmits a data packet 400 containing an 802.1X authentication request to the authenticator PAE 330. The request is preferably formatted as an EAP over LAN (EAPOL) data packet.

Figure 4:
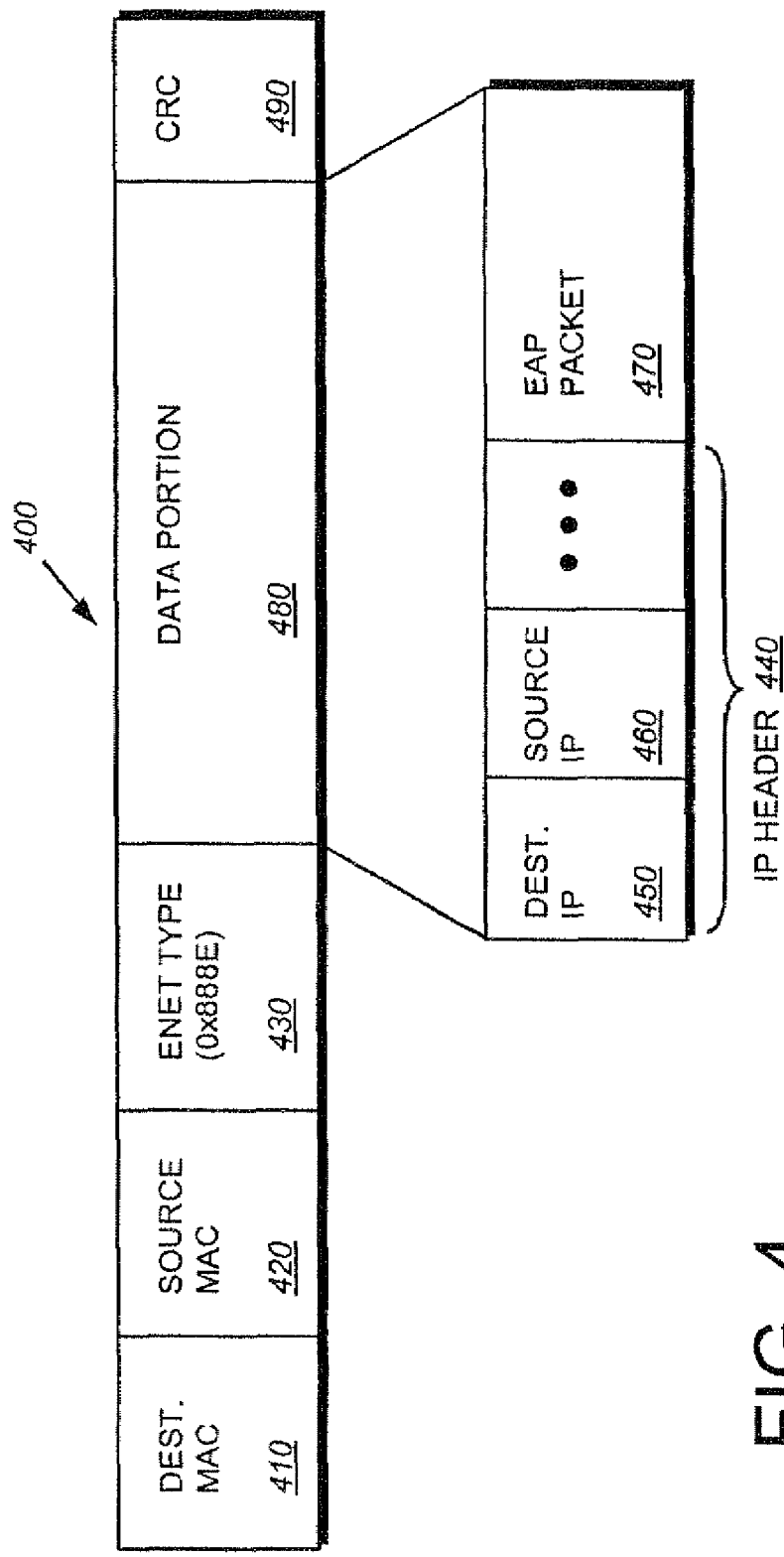
FIG. 4 is a schematic block diagram of an exemplary 802.1X authentication request that may be transmitted between the client node and shared media port in FIG. 3.

FIG. 4 illustrates the contents of the exemplary EAPOL packet 400. The packet is a conventional 802.3 Ethernet frame including, inter alia, a destination MAC field 410, a source MAC field 420, an Ethernet-type field 430, a data portion 480 and a cyclic redundancy check (CRC) field 490. Notably, the Ethernet frame may also include other datalink information, such as link-layer control (LLC) and subnetwork access protocol (SNAP) information, depending on the home LAN 140 configuration.

Since the packet 400 is transmitted from the client-node port 310 to the shared media port 300, the source MAC field 420 stores the client-node port's MAC address and the destination MAC field 410 stores the shared media port's MAC address. Preferably, both MAC addresses are 48-bit address values that uniquely identify the network interfaces associated with the ports 310 and 300. The Ethernet-type field 430 stores a value that indicates the type of data contained in the data portion 480. For example, an Ethernet-type field equal to the hexadecimal value 0x888E may indicate that the data portion 480 comprises an EAP packet 470 being transmitted from one PAE to another.

The data portion 480 may comprise additional network headers, such as an IP header 440, prepended to the EAP packet 470. The IP header includes, among other things, a destination IP field 450 and a source IP field 460 that collectively define a logical path through the computer network. Specifically, the packet is generated at a first network node assigned the source IP address 440 and is addressed to a second network node assigned the destination IP address 450. In this case, the first network node generates the EAP packet 470 that is forwarded to the second network node. The EAP packet may comprise an authentication request identifying a corresponding authentication protocol, such as the Challenge-Handshake Authentication Protocol (CHAP), Transport Layer Security (TLS), one-time password (OTP), etc. The CRC field 490 stores a data-integrity check value that may be used to detect and/or correct errors in the packet 400 after the packet is received over a physical link.

In general, the authenticator PAE 330 is configured to scan data packets received at the shared media port 300 to determine whether the packets contain 802.1X authentication requests. For instance, a predetermined value (e.g., 0x888E) stored in the Ethernet-type field 430 may identify the packet as an 802.1X request. If the authenticator PAE 330 determines that a received packet contains an 802.1X request, the PAE 330 may extract an EAP authentication request 470 from the received packet and, if necessary, reformat the request before forwarding it to an appropriate authentication service, such as the authentication server 180. Although the illustrative authentication server 180 is located in the enterprise network 160, it is also contemplated that the authenticator PAE may forward the request to an authentication service "outside" the enterprise network. In such embodiments, the authenticator PAE 330 may route the EAP authentication request over the Internet 150, rather than over the enterprise VPN 155.

After receiving the 802.1X request, the authentication server 180 cooperates with the authenticator PAE 330 and supplicant PAE 320 to determine the client node's authentication state, e.g., at the trusted subinterface 340. To that end, the authentication server may engage in a sequence of challenge-response exchanges with the client node (or user at the client node) via the supplicant and authenticator PAEs. Illustratively, at the end of the authentication process, the authentication server 180 assigns the client node to one of three possible authentication states at the trusted subinterface: authenticated, unauthenticated or unknown. The result of the authentication process is returned to the authenticator PAE 330. The authenticator PAE subsequently may notify the client node of its authentication state at the trusted subinterface 340.

The authenticator PAE 330 records the client node's authentication state in a MAC filter 500 associated with the shared media port 300. The MAC filter identifies which (if any) of the logical subinterfaces 340 and 350 are accessible to the client nodes 110 and whether the client nodes are authenticated to communicate over those subinterfaces. When the EAPOL packet 400 is initially received at the shared media port 300, the network operating system 230 is configured to parse the packet's source MAC address 420 from its data-link header information. The operating system also identifies the subinterface to which the packet is addressed, e.g., as indicated by the packet's VLAN identifier, destination IP address 450 or the like. The parsed MAC address 420 and its addressed subinterface are then stored in an appropriate entry in the MAC filter 500. If the MAC filter was not already created, e.g., in the memory 220, the network operating system 230 may be configured to "dynamically" create the filter in response to receiving the packet 400 at the shared media port.

FIG. 5 illustrates an exemplary MAC filter 500 that may be employed at the shared media port 300. The MAC filter 500 stores a list of client-node MAC addresses 510, wherein each address is associated with a respective subinterface 520 and an authentication state 530 (e.g., authenticated, unauthenticated or unknown). Preferably, the filter is organized as a hash table. That is, an entry in the MAC filter 500 may be located by indexing the filter based on the result of applying a hash function, such as the Message Digest 5 (MD5) function, to a parsed MAC address 420. The MAC filter 500 illustrates two exemplary entries corresponding to client nodes 110 having network interfaces assigned to the MAC addresses MAC1 and MAC2. As shown, the client nodes associated with MAC1 and MAC2 are authenticated to communicate over the trusted subinterface 340. Of note, because a client node may be authorized to communicate through more than one subinterface, the MAC filter 500 may contain multiple entries associated with the same MAC address 510, e.g., MAC1 or MAC2.

In the illustrative embodiment, the MAC filter 500 does not store MAC addresses 510 corresponding to wireless client nodes 110 connected to the AP 120. In particular, network security may be compromised when at least one client node connected to the AP is authenticated to communicate through the trusted subinterface 340, although other client nodes connected to the AP are not. Accordingly, the AP 120 is preferably coupled to port 260 in the intermediate node 200, rather than to the shared media port 300. Typically, the AP 120 implements its own security measures (e.g., network access control) to ensure that unauthorized wireless client nodes can not access the home LAN 140 through the AP.

Advantageously, the network operating system 230 can use the MAC filter 500 to essentially "switch" the shared media port 300 from an uncontrolled state to a controlled state on a client-by-client basis. Specifically, the port 300 is set to a controlled state if a packet 130 is received at the port from a client node that is authenticated at the packet's addressed subinterface. Otherwise, the shared media port is set to the uncontrolled state. For example, assume that in the uncontrolled state, packets received by the shared media port are directed to the untrusted subinterface 350, and, in the controlled state, packets are directed to the trusted subinterface 340. In this case, when the packet 400 is received at the shared media port 300, the operating system 230 parses the packet's source MAC address 420 and indexes an appropriate entry in the MAC filter 500. If the MAC-filter entry indicates that the packet's sender is authenticated at the trusted subinterface 340, then the operating system sets the shared media port to the controlled state. On the other hand, if the sender is unauthenticated, the packet may be dropped or re-directed to a subinterface at which the sender is authenticated. If the sender's authentication state is unknown, then the packet is preferably dropped.

As subsequent 802.1X requests are received at the shared media port 300, the MAC filter 500 may be dynamically updated to include new client-node MAC addresses 510 and/or authentication states 530. For instance, a new MAC address 510 and authentication state 530 may be added to the MAC filter when an authentication request 400 is received from a client node whose authentication state is not already recorded in the filter. Further, an authentication state 530 stored in the filter may be updated as a result of re-authenticating a client node. That is, after an 802.1X re-authentication process, the authentication server 180 may determine that a client node's authentication state at the trusted subinterface 340 has changed, e.g., from authenticated to unauthenticated, and the authenticator PAE 330 may modify the MAC filter 500 accordingly.

Illustratively, if the authentication server 180 fails to authenticate a client node 110, e.g., at the trusted subinterface 340, a predetermined number of times (e.g., 2), the network operating system 230 may transmit an "alarm" message over the enterprise VPN 155 to indicate that the client node may be attempting to compromise the security of the enterprise network 160. The alarm may be triggered by other events as well, such as a change in a client node's authentication state, e.g., from authenticated to unauthenticated. The alarm message may be formatted according to the Simple Network Management Protocol (SNMP) or the like. In the case of an SNMP alarm message, the possible security breach also may be recorded in a security "object" stored in an 802.1X Management Information Base (MIB) implemented at the intermediate node 200. The SNMP protocol is described in more detail in RFC 2571 entitled *An Architecture for Describing SNMP Management Frameworks*, published April 1999, which is hereby incorporated by reference as though set forth fully herein. In response to receiving the alarm message, network nodes in the enterprise network 160 may implement increased security measures, such as access control lists (ACL), passwords, etc.

Figure 6:
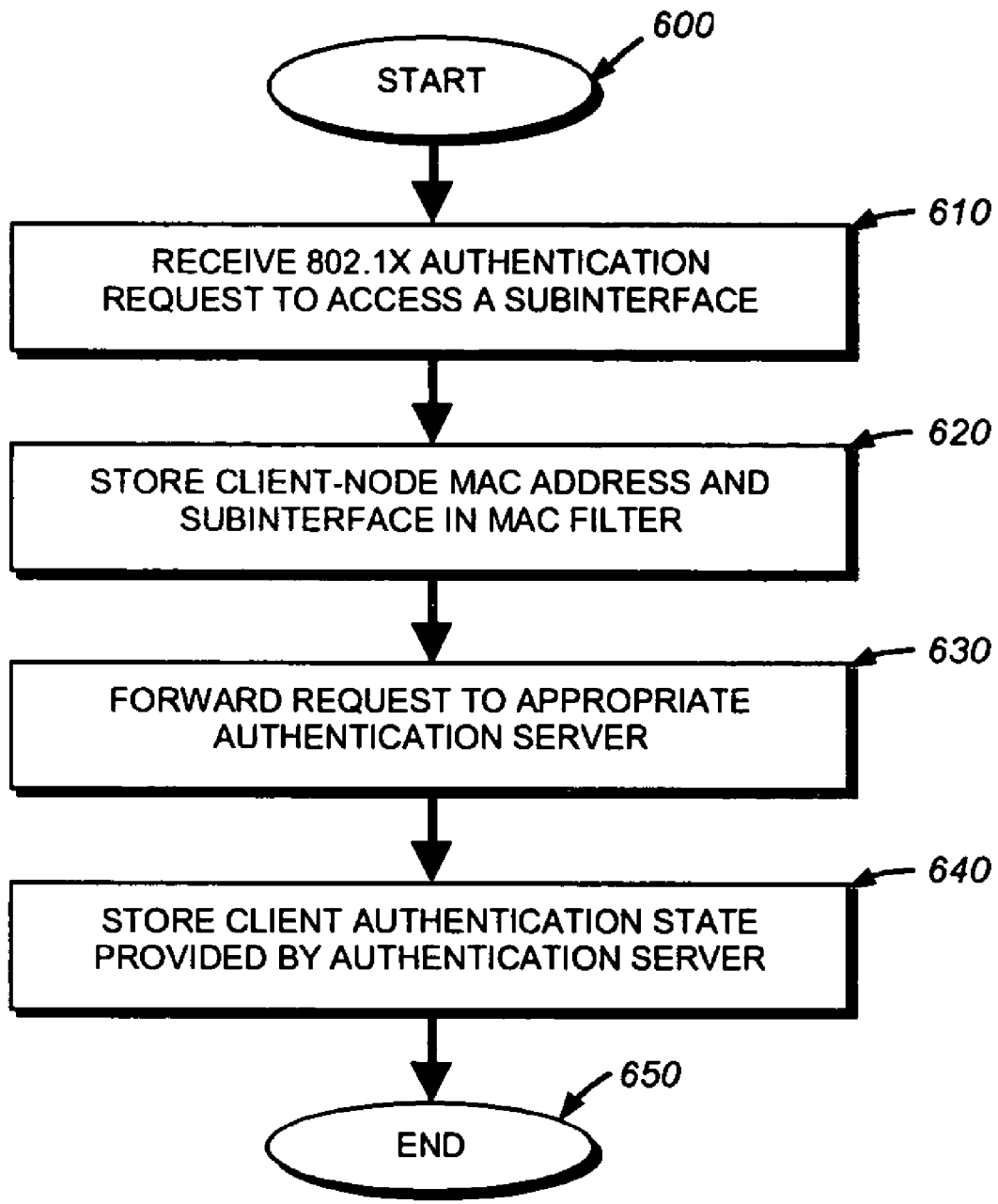
FIG. 6 is a flowchart illustrating a sequence of steps for updating the contents of FIG. 5's MAC filter.

FIG. 6 illustrates a sequence of steps for updating the contents of the MAC filter 500. The sequence begins at step 600 and proceeds to step 610 where an 802.1X authentication request is received at the shared media port 300. Here, it is assumed that packets received from unauthenticated client nodes 110 are directed to the shared media port's untrusted subinterface 350, whereas packets received from authenticated client nodes are directed to the trusted subinterface 340. Therefore, 802.1X requests received at the shared media port 300 implicitly correspond to client-node requests for authentication at the trusted subinterface 340.

At step 620, the client node's MAC address 420 is parsed from the 802.1X request and stored at an appropriate entry in the MAC filter 500. For instance, the MAC filter entry may be indexed based on the result of applying a hash function to the parsed MAC address 420. The MAC-filter entry may also store an indication of the subinterface, e.g., trusted subinterface 340, at which the client node seeks to be authenticated. Next, at step 630, the authenticator PAE 330 associated with the shared media port 300 forwards the received authentication request to the enterprise network's authentication server 180. After performing a predetermined authentication procedure, e.g., as specified in the client node's 802.1X request, the authentication server 180 returns the client node's authentication state to the authenticator PAE 330. At step 640, the authenticator PAE stores the returned authentication state in the client node's associated MAC-filter entry. The sequence ends at step 650.

Figure 7:
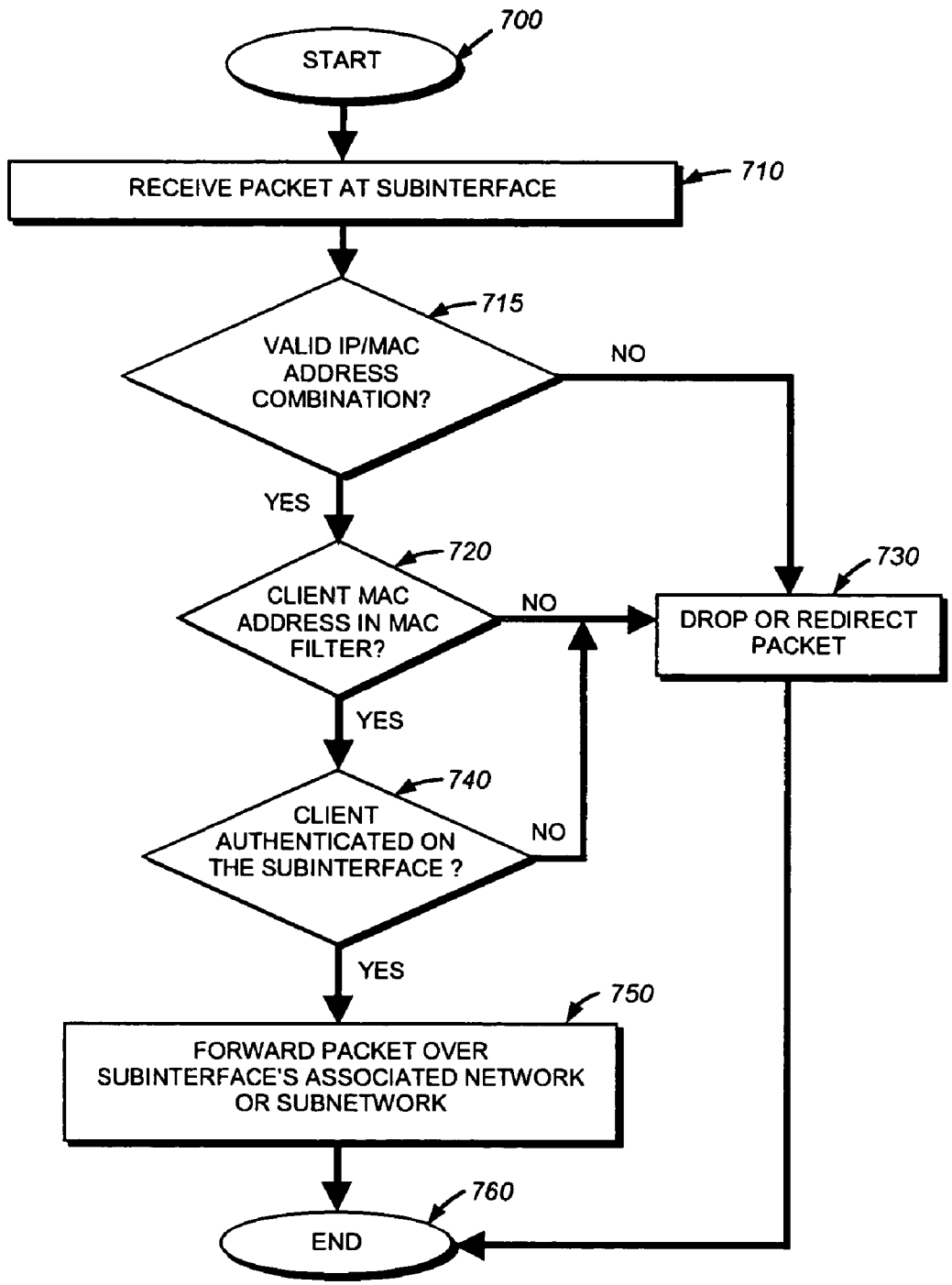
FIG. 7 is a flowchart illustrating a sequence of steps for determining whether a packet received at a logical subinterface of a shared media port may be forwarded over the subinterface's associated network or subnetwork.

FIG. 7 is a flowchart illustrating a sequence of steps for determining whether a packet 130 received at a logical subinterface of the shared media port 300 may be forwarded over the subinterface's associated network or subnetwork. The sequence starts at step 700 and proceeds to step 710 where the packet 130 is received at the shared media port. Illustratively, the received packet is associated with the trusted subinterface 340 if it contains a destination IP address 450 within the enterprise network 160's allocated IP space and the packet's destination IP address forms a valid combination with its source MAC address 420. More specifically, at step 715, if the IP address and MAC address are determined to be a valid combination, then the sequence advances to step 720. Otherwise, the packet is "dropped" (i.e., not forwarded) or redirected to a different subinterface at step 730; the sequence ends at step 760. For example, if the received packet is not associated with the trusted subinterface 340, the packet may be associated with the untrusted subinterface 350 and forwarded over the Internet 150.

If the received packet is associated with the trusted subinterface 340, then, at step 720, the network operating system 230 determines whether the packet's source MAC address 420 is stored in the MAC filter 500. At step 730, the packet is dropped if the source MAC address is not stored in the filter 500; then, the sequence ends at step 760. Alternatively, at step 730, the packet may be redirected to the untrusted subinterface and forwarded over the Internet 150. When a MAC-filter entry matches the source MAC address 420 at step 720, the sequence proceeds to step 740 where the operating system 230 determines whether the client node is authenticated to communicate over the trusted subinterface 340 based on the contents of the matching MAC-filter entry. If the authentication state 530 stored in the matching filter entry indicates that the client node is not authenticated at the trusted subinterface, the sequence returns to step 730. On the other hand, if the client node is authenticated, then, at step 750, the received packet is forwarded over the enterprise VPN 155. The sequence ends at step 760.

According to the illustrative embodiment, the intermediate node 200 may be configured to drop data packets 130 received from "outside" network nodes (i.e., not located in the home network 100) if the packets are addressed to client nodes that are not authorized to receive them. For example, the intermediate node 200 may drop a data packet 130 received from the enterprise VPN 155 if the packet is addressed to a non-enterprise client node 110 in the home network 100. To that end, the intermediate node may store one or more routing tables 250 that are configured to "bind" certain client-node IP addresses to logical subinterfaces. Broadly stated, the network operating system 230 is configured to route a received data packet based on the contents of an appropriate routing table 250, e.g., stored at a known location in the memory 220. If the routing table indicates that the received packet is to be routed to a shared media port in the intermediate node, the routing table 250 may also specify a particular subinterface to which the packet is routed. Then, a MAC filter 500 associated with the subinterface may be used to determine whether the packet's addressed client node is authenticated at the subinterface. If so, the packet is forwarded to the client node. Otherwise, the packet is dropped.

Figure 8:
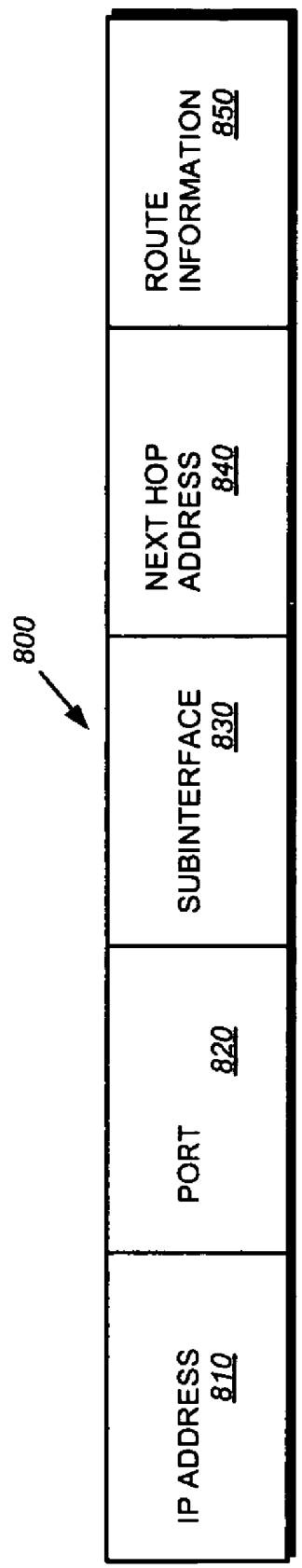
FIG. 8 is a schematic block diagram of an exemplary entry of a routing table that may be employed in FIG. 2's intermediate node.

FIG. 8 illustrates an exemplary routing-table entry 800 that stores information for routing a packet 130 received at the intermediate node 200. The entry 800 contains a plurality of fields that respectively store, inter alia, an IP address 810, a port 820, a subinterface 830, a next-hop address 840 and other route information 850. The IP address 810 is a value, typically 32 bits in length, that represents a network address assigned to a specific network node. The port 820 stores a value that identifies an intermediate-node port coupled (directly or indirectly) to the node assigned the IP address 810. If the port 820 is a shared media port, the subinterface 830 may store a value indicating a logical subinterface implemented at that shared media port. The next-hop address 840 stores an IP address of a network node to which the network operating system 230 may forward the received packet 130. The routing information 850 stores other information, such as flags, aging information, status information, etc., that may facilitate routing operations performed by the network processing engine 210.

Figure 9:
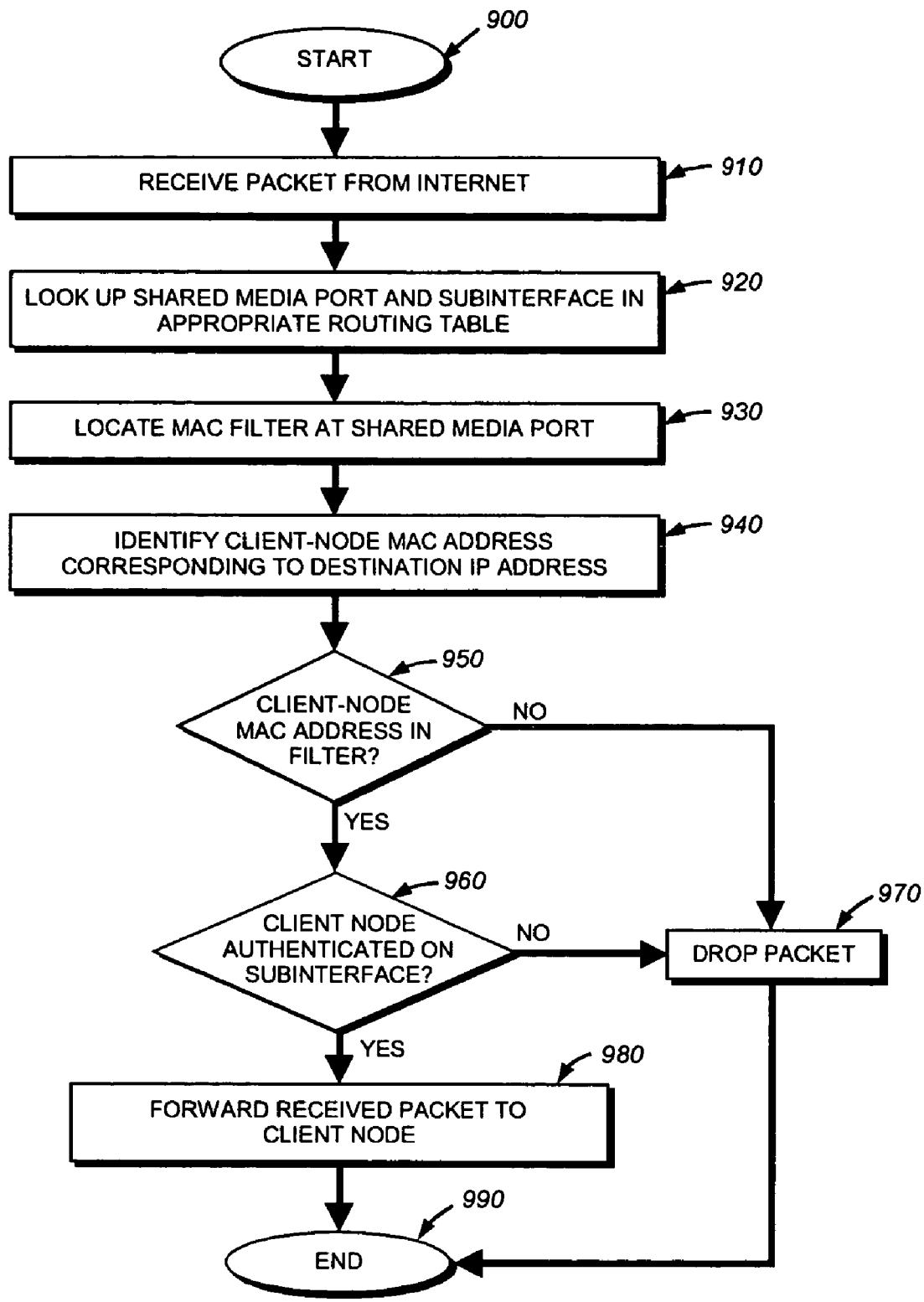
FIG. 9 is a flowchart illustrating a sequence of steps for determining whether a packet received at FIG. 2's intermediate node may be forwarded through the shared media port to the packet's addressed destination client node.

FIG. 9 illustrates a sequence of steps that may be performed when a packet 130 is received at the intermediate node 200, e.g., from the Internet 150. Here, it is assumed that the received packet is addressed to a client node 110 coupled to the shared media port 300. The sequence begins at step 900 and advances to step 910 where the packet is received at the intermediate node 200. Next, at step 920, the network operating system 230 locates a destination IP address 450 in the packet's IP header 440. The operating system then locates an appropriate routing table 250, e.g., located at a known location in the memory 220. The operating system indexes an entry 800 in the routing table based on the value of the packet's destination IP address 450. Among other things, the indexed entry identifies a port 820 to which the packet may be routed, and additionally may identify a particular subinterface 830 at the port 820. For purposes of explanation, assume the port 820 corresponds to the shared media port 300 and the subinterface 830 corresponds to the trusted subinterface 340.

At step 930, the network operating system 230 locates the MAC filter 500 associated with the port 820, i.e., the shared media port 300. At step 940, the network operating system 230 also maps the destination IP address 450 to a corresponding client-node MAC address. Assuming this mapping is not already stored in the intermediate node 200, the operating system can broadcast an Address Resolution Protocol (ARP) request over its network interfaces. In response, the client node assigned to the destination IP address 450 returns its MAC address to the intermediate node 200. The ARP protocol is described in more detail in RFC 826 entitled *An Ethernet Address Resolution Protocol*, published November 1982, which is hereby incorporated by reference as though set forth fully herein. However, those skilled in the art will appreciate that the IP address-to-MAC address conversion may be performed using other techniques as well.

Next, at step 950, the MAC address received from the client node is hashed and the resultant hash value is used to index an entry in the MAC filter 500. If a matching entry in the MAC filter cannot be located, then, at step 970, the packet is dropped at the intermediate node 200 and the sequence ends at step 990. Alternatively, the packet 130 may be re-directed to a more appropriate subinterface on the shared media port, if possible. However, if the MAC filter 500 contains an entry matching the received MAC address, at step 960, the operating system 230 identifies the MAC address's corresponding authentication state 530 stored in the MAC-filter entry. At step 980, if the packet 130's addressed node is authenticated, the packet is forwarded to the node. Otherwise, the packet is dropped or reclassified to a more appropriate subinterface, at step 970. The sequence ends at step 990.

Further to the illustrative embodiment, an IP filter 1000 may be employed at the shared media port 300. The IP filter stores a list of IP addresses corresponding to client nodes 110 connected to the shared media port. The IP filter may be organized in a variety of ways, such as a hash table, linked list, tree-based structure, etc. The IP filter 1000 cooperates with the MAC filter 500 to essentially override certain access restrictions provided by the MAC filter. That is, while the MAC filter typically does not permit client nodes authenticated on different subinterfaces to communicate with one another, the IP filter may. As a result, client nodes whose IP addresses are stored in the IP filter can communicate with one another over the shared media port, regardless of their authentication states stored in the MAC filter.

Figure 10:
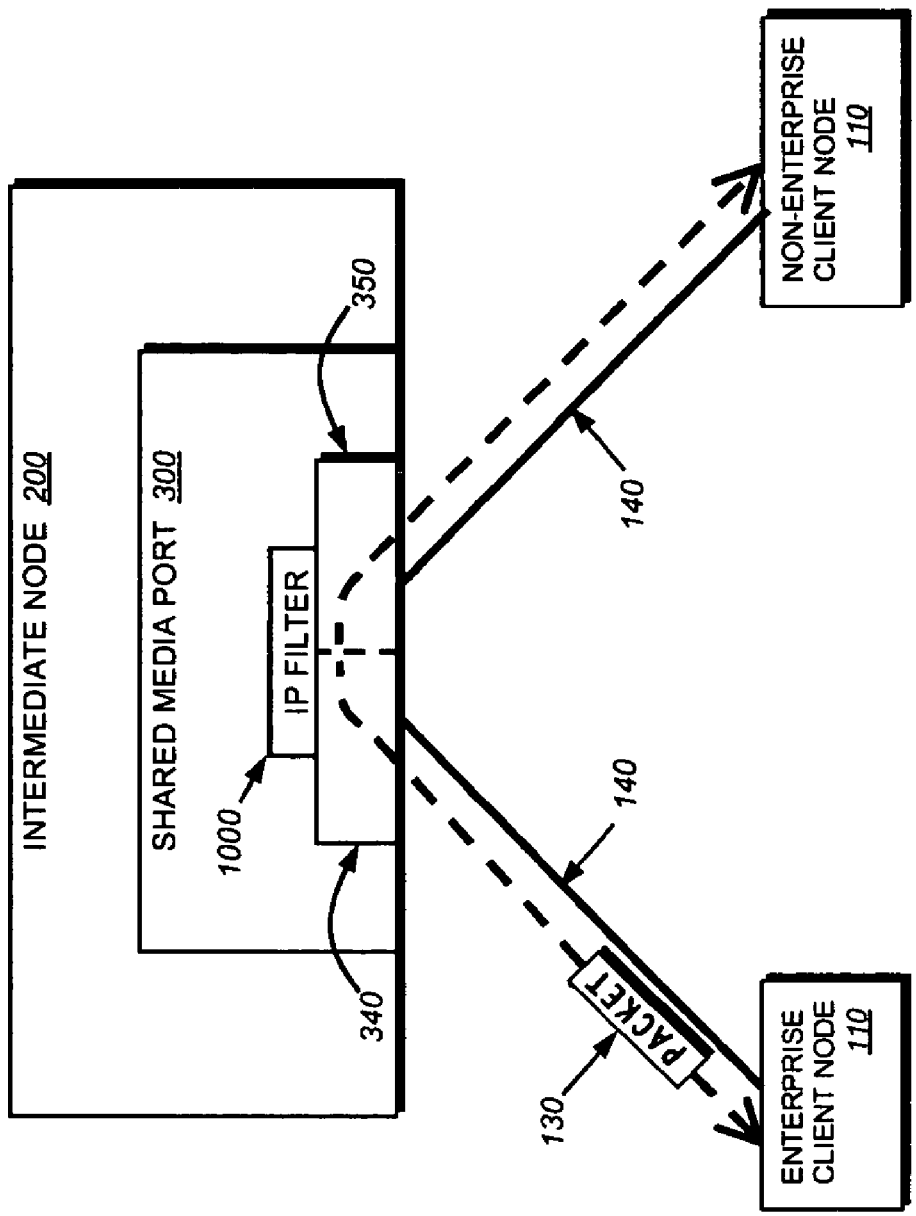
FIG. 10 is a schematic block diagram of an exemplary IP filter that may be employed in FIG. 2's intermediate node.

FIG. 10 illustrates an enterprise client node 110 and an non-enterprise client node 110 connected to the shared media port 300. Illustratively, data packets 130 transmitted from the enterprise client node are directed to the trusted subinterface 340. On the other hand, the non-enterprise client node communicates data packets 130 to the untrusted subinterface 350. Suppose the enterprise client node (e.g., a telecommuter) desires to send a packet 130 to the non-enterprise client node (e.g., a local printer) through the shared media port 300 in the intermediate node 200. The intermediate node stores an IP filter 1000 that contains a list of IP addresses assigned to client nodes authorized to communicate directly through the shared media port. When the packet 130 is received at the intermediate node 200, the network operating system 230 determines whether the packet contains a destination IP address 450 that matches an IP address stored in the IP filter. If so, the operating system forwards the packet to its addressed client node, regardless of the packet's associated authentication state 530 stored in the MAC filter 500.

Figure 11:
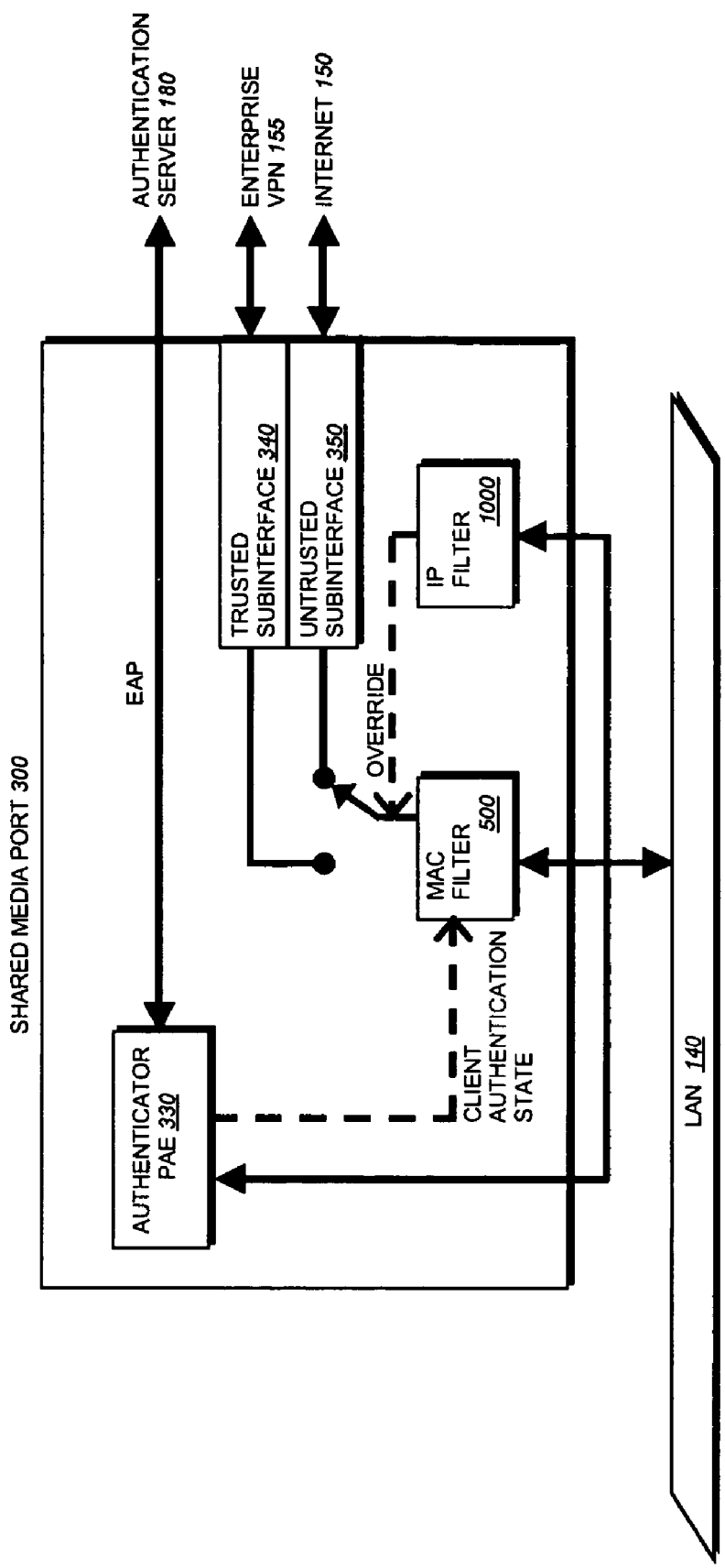
FIG. 11 is a schematic block diagram of an exemplary shared media port at which FIG. 10's IP filter may be implemented in accordance with the present invention.

FIG. 11 illustrates a schematic block diagram of the shared media port 300 including the IP filter 1000. When a packet 130 is received at the shared media port, the packet's source MAC address 420 is compared with entries in the MAC filter 500. In addition, the packet's destination address 450 may be compared with entries in the IP filter 1000. If the destination address 450 matches an entry in the IP filter, the received packet is forwarded to its addressed destination node, regardless of the source MAC address 420's associated authentication state 530 stored in the MAC filter. In this manner, the IP filter 1000 can override possible network access restrictions imposed by the MAC filter 500.

Figure 12:
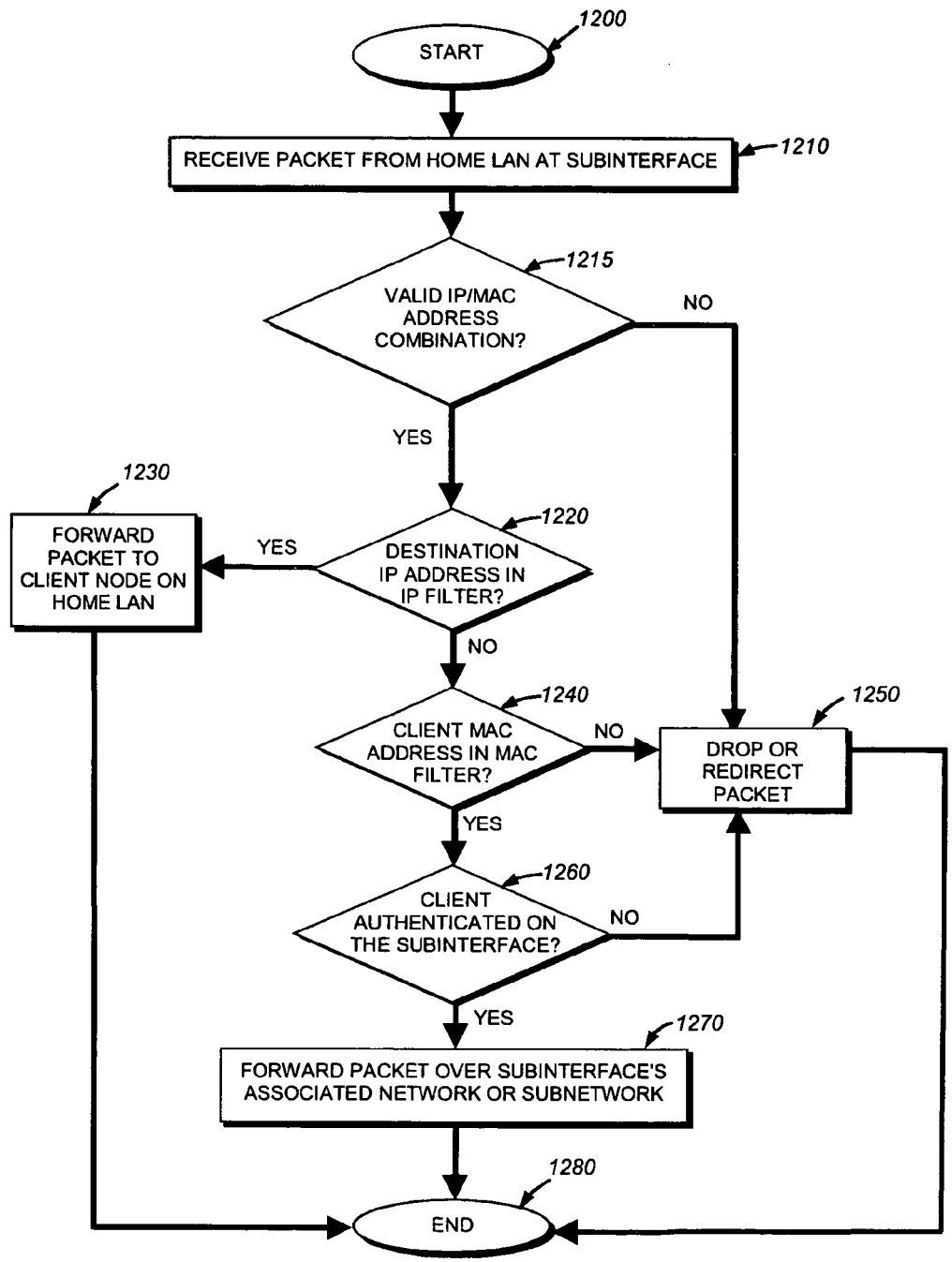
FIG. 12 is a flowchart illustrating a sequence of steps for determining whether a packet received at a logical subinterface of a shared media port may be forwarded to its addressed destination client node.

FIG. 12 illustrates a sequence of steps for forwarding a packet 130 received at the shared media port 300. The sequence starts at step 1200 and proceeds to step 1210 where the packet 130 is received at the shared media port from a first client node 110 in the home LAN 140. The packet may contain source and destination MAC addresses 410 and 420, as well as source and destination IP addresses 460 and 450. In the illustrative embodiment, the received packet is associated with the trusted subinterface 340 if its destination IP address 450 is included in the enterprise network 160's allocated IP space and its destination IP address forms a valid combination with its source MAC address 420. Specifically, at step 1215, if the IP address and MAC address are determined to be a valid combination, then the sequence advances to step 1220. Otherwise, the packet is "dropped" (i.e., not forwarded) or redirected to a different subinterface at step 1250; the sequence ends at step 1280. For example, if the received packet is not associated with the trusted subinterface 340, the packet may be associated with the untrusted subinterface 350 and forwarded over the Internet 150.

At step 1220, the network operating system 230 determines whether the destination IP address 450 matches an IP address stored in the IP filter 1000. If so, at step 1230, the packet is forwarded to its addressed node in the home LAN 140 and the sequence ends at step 1280. The sequence advances to step 1240 if the packet's destination IP address 450 is not located in the IP filter 1000. At step 1240, the network operating system 230 determines whether the packet's source MAC address 420 is stored in the MAC filter 500. If not, the packet is dropped at step 1250 and the sequence ends at step 1280. Alternatively, at step 1250, the packet may be redirected to the untrusted subinterface and forwarded over the Internet 150, when appropriate. If the MAC address 420 matches an entry in the MAC filter 500, the operating system 230 determines whether the client node is authenticated to communicate over the trusted subinterface 340 based on the authentication state 530 stored in the matching MAC-filter entry, at step 1260. If the client node is not authenticated, the sequence returns to step 1250. Otherwise, at step 1270, the received packet 130 is forwarded over the enterprise VPN 155. The sequence ends at step 1280.

C. Conclusion

The foregoing has been a detailed description of illustrative embodiments of the invention. Various modifications and additions can be made without departing from the spirit and scope of the invention. For example, the trusted subinterface 340 may be configured to implement conventional split tunneling techniques. Accordingly, packets directed to the trusted subinterface 340 may be routed not only through the enterprise VPN 155, but also directly to the Internet 150. Thus, split tunneling can reduce the amount of network traffic directed to the enterprise network 160, thereby reducing the consumption of bandwidth at the enterprise 160's "gateway" servers, such as at the intermediate node 195.

While the illustrative embodiment describes a port-based network access control technique at the shared media port 300, the technique is more generally applicable at any port employing network access control at a plurality of subinterfaces. In addition, although the illustrative embodiment describes a single MAC filter 500 at the shared media port, it is also contemplated that separate MAC filters may be associated with each logical subinterface on the shared media port.

It is expressly contemplated that the teachings of this invention can be implemented as software, including a computer-readable medium having program instructions executing on a computer, hardware, firmware, or a combination thereof. Accordingly this description is meant to be taken only by way of example and not to otherwise limit the scope of the invention.

What is claimed is:

1. A method for implementing port-based network access control at a shared media port in an intermediate node, the shared media port being a physical interface coupled to a plurality of client nodes, the method comprising:
  partitioning the shared media port into a plurality of logical subinterfaces, wherein a logical subinterface is a logical division of a physical interface, each logical subinterface dedicated to providing access to a different network or subnetwork accessible through the intermediate node;
  receiving a data packet at the shared media port from a first client node;
  associating the received data packet with a first logical subinterface in the plurality of logical subinterfaces;
  determining whether the first client node is authenticated to communicate over the first logical subinterface's dedicated network or subnetwork;
  if the first client node is determined to be authenticated to communicate over the first logical subinterface's dedicated network or subnetwork, forwarding the received data packet over the first logical subinterface's dedicated network or subnetwork;
  receiving a second data packet at the shared media port from a second client node;
  associating the second received data packet with the first logical subinterface;
  determining whether the second client node is authenticated to communicate over the first logical subinterface's dedicated network or subnetwork; and
  if the second client node is determined to not be authenticated to communicate over the first logical subinterface's dedicated network or subnetwork, preventing the second received data packet from being forwarded over the first logical subinterface's dedicated network or subnetwork, while still allowing data packets from the first client node to be forwarded if the first client node is determined to be authenticated.

2. The method according to claim 1, further comprising:
  performing at least one of dropping the received data packet or reclassifying the received data packet to a different logical subinterface, if the first client node is determined not to be authenticated to communicate over the first logical subinterface's dedicated network or subnetwork.

3. The method according to claim 1, wherein the first logical subinterface's dedicated network or subnetwork is a virtual private network (VPN).

4. The method according to claim 1, wherein a logical subinterface in the plurality of logical subinterfaces is dedicated to providing access to the Internet.

5. The method according to claim 1, wherein the step of determining whether the first client node is authenticated to communicate over the first logical subinterface's dedicated network or subnetwork further comprises:
  parsing a source media access control (MAC) address from the received data packet;
  indexing an entry in a MAC filter associated with the shared media port based on the value of the parsed source MAC address;
  identifying an authentication state stored in the indexed MAC-filter entry; and
  determining whether the first client node is authenticated to communicate over the first logical subinterface's dedicated network or subnetwork based on the authentication state stored in the indexed MAC-filter entry.

6. The method according to claim 5, wherein the MAC filter is organized as a hash table.

7. The method according to claim 1, further comprising:
  parsing a destination Internet Protocol (IP) address from the received data packet;
  comparing the parsed destination IP address to one or more IP addresses stored in an IP filter associated with the shared media port; and
  if the parsed destination IP address matches an IP address stored in the IP filter, forwarding the received data packet over the first logical subinterface's dedicated network or subnetwork, even if the first client node is determined not to be authenticated to communicate over that network or subnetwork.

8. The method according to claim 1, wherein the step of associating the received data packet with the first logical subinterface, further comprises:
  locating an entry in a routing table configured to store routing information associated with the received data packet; and
  associating the received data packet with the first logical subinterface based on the contents of the routing-table entry.

9. The method according to claim 1, further comprising:
  receiving an authentication request from the first client node at the shared media port;
  in response to receiving the authentication request, creating a MAC filter associated with the shared media port if the MAC filter has not already been created;
  copying a source MAC address stored in the received authentication request into an appropriate entry in the MAC filter;
  forwarding the received authentication request to an authentication service;
  receiving a response from the authentication service, the response identifying an authentication state associated with the first client node; and
  storing the authentication state into the same MAC-filter entry into which the source MAC address was copied.

10. The method according to claim 9, wherein the step of copying the source MAC address into an appropriate MAC-filter entry further comprises:
  indexing an entry in the MAC filter based on the result of applying a hash function to the source MAC address; and
  storing the source MAC address at the indexed MAC-filter entry.

11. The method according to claim 9, wherein the received authentication request is an 802.1X authentication request.

12. The method according to claim 9, further comprising:
  sending an alarm message over the first logical subinterface's dedicated network or subnetwork after the first client node fails to authenticate at the shared media port a predetermined number of times.

13. The method according to claim 9, further comprising:
  sending an alarm message over the first logical subinterface's dedicated network or subnetwork after the first client node's authentication state changes from an authenticated state to an unauthenticated or unknown state.

14. An intermediate node for implementing port-based network access control in a network containing a plurality of client nodes, the intermediate node comprising:
  a processor;
  a shared media port that is a physical interface for receiving a data packet from a first client node, and a second data packet from a second client node, in the plurality of client nodes; and a memory adapted to store instructions for execution by the processor, at least a portion of the instructions defining a network operating system configured to perform the steps of:
  partitioning the shared media port into a plurality of logical subinterfaces, wherein a logical subinterface is a logical division of a physical interface, each logical subinterface dedicated to providing access to a different network or subnetwork accessible through the intermediate node;
  associating the data packet received from the first client node with a first logical subinterface in the plurality of logical subinterfaces;
  determining whether the first client node is authenticated to communicate over the network or subnetwork to which the first logical subinterface provides dedicated access;
  forwarding the received data packet over the first logical subinterface's dedicated network or subnetwork only if the first client node is determined to be authenticated to communicate over that network or subnetwork
  associating the second received data packet with the first logical subinterface;
  determining whether the second client node is authenticated to communicate over the first logical subinterface; and
  preventing the second received data packet from being forwarded over the first logical subinterface's dedicated network or subnetwork if the second client node is determined to not be authenticated to communicate over that network or subnetwork, while still allowing data packets from the first client node to be forwarded over that network or subnetwork if the first client node is determined to be authenticated.

15. The intermediate node according to claim 14, wherein:
the memory is further adapted to store a MAC filter containing one or more entries configured to store at least a MAC address and an authentication state, and
the network operating system is further configured to perform the steps:
  receiving an authentication request from the first client node at the shared media port;
  copying a source MAC address stored in the received authentication request into an appropriate entry in the MAC filter;
  forwarding the received authentication request to an authentication service;
  receiving a response from the authentication service, the response identifying an authentication state associated with the first client node; and
  storing the authentication state into the same MAC-filter entry into which the source MAC address was copied.

16. The intermediate node according to claim 14, wherein:
the memory is further adapted to store an IP filter containing a list of IP addresses, and
the network operating system is further configured to perform the steps:
  parsing a destination IP address from the received data packet;
  comparing the parsed destination IP address to one or more IP addresses stored in an IP filter associated with the shared media port; and
  if the parsed destination IP address matches an IP address stored in the IP filter, forwarding the received data packet over the first logical subinterface's dedicated network or subnetwork, even if the first client node is determined not to be authenticated to communicate over that network or subnetwork.

17. The intermediate node according to claim 14, wherein:
the memory is further adapted to store a MAC filter containing one or more entries configured to store at least a MAC address and an authentication state, and
the network operating system is further configured to perform the steps:
  parsing a source MAC address from the received data packet;
  indexing an entry in a MAC filter associated with the shared media port based on the value of the parsed source MAC address;
  identifying an authentication state stored in the indexed MAC-filter entry; and
  determining whether the first client node is authenticated to communicate over the first logical subinterface's dedicated network or subnetwork based on the authentication state stored in the indexed MAC-filter entry.

18. An apparatus that implements port-based network access control at a shared media port, the shared media port being a physical interface coupled to a plurality of client nodes, the apparatus comprising:
  means for partitioning the shared media port into a plurality of logical subinterfaces, wherein a logical subinterface is a logical division of a physical interface, each logical subinterface dedicated to providing access to a different network or subnetwork accessible through the intermediate node;
  means for receiving a data packet at the shared media port from a first client node;
  means for associating the received data packet with a first logical subinterface in the plurality of logical subinterfaces;
  means for determining whether the first client node is authenticated to communicate over the first logical subinterface's dedicated network or subnetwork;
  means for forwarding the received data packet over the first logical subinterface's dedicated network or subnetwork;
  means for receiving a second data packet at the shared media port from a second client node;
  means for associating the second received data packet with the first logical subinterface;
  means for determining whether the second client node is authenticated to communicate over the first logical subinterface's dedicated network or subnetwork; and
  means for preventing the second received data packet from being forwarded over the first logical subinterface's dedicated network or subnetwork, while still allowing data packets from the first client node to be forwarded.

19. The apparatus according to claim 18, wherein the means for determining whether the first client node is authenticated to communicate over the first logical subinterface's dedicated network or subnetwork further comprises:
  means for parsing a source MAC address from the received data packet;
  means for indexing an entry in a MAC filter associated with the shared media port based on the value of the parsed source MAC address;
  means for identifying an authentication state stored in the indexed MAC-filter entry; and
  means for determining whether the first client node is authenticated to communicate over the first logical subinterface's dedicated network or subnetwork based on the authentication state stored in the indexed MAC-filter entry.

20. The apparatus according to claim 18, further comprising:
means for parsing a destination IP address from the received data packet;
means for comparing the parsed destination IP address to one or more IP addresses stored in an IP filter associated with the shared media port; and
means for forwarding the received data packet over the first logical subinterface's dedicated network or subnetwork, even if the first client node is determined not to be authenticated to communicate over that network or subnetwork.

21. The apparatus according to claim 18, wherein the means for associating the received data packet with the first logical subinterface, further comprises:
means for locating an entry in a routing table configured to store routing information associated with the received data packet; and
means for associating the received data packet with the first logical subinterface based on the contents of the routing-table entry.

22. The apparatus according to claim 18, further comprising:
means for receiving an authentication request from the first client node at the shared media port;
means for creating a MAC filter associated with the shared media port if the MAC filter has not already been created;
means for copying a source MAC address stored in the received authentication request into an appropriate entry in the MAC filter;
means for forwarding the received authentication request to an authentication service;
means for receiving a response from the authentication service, the response identifying an authentication state associated with the first client node; and
means for storing the authentication state into the same MAC-filter entry into which the source MAC address was copied.

23. The apparatus according to claim 22, wherein the received authentication request is an 802.1X authentication request.

24. A computer-readable media including instructions for execution by a processor, the instructions for a method of implementing port-based network access control at a shared media port in an intermediate node, the shared media port being a physical interface coupled to a plurality of client nodes, the method comprising the steps:
partitioning the shared media port into a plurality of logical subinterfaces, wherein a logical subinterface is a logical division of a physical interface, each logical subinterface dedicated to providing access to a different network or subnetwork accessible through the intermediate node;
receiving a data packet at the shared media port from a first client node;
associating the received data packet with a first logical subinterface in the plurality of logical subinterfaces;
determining whether the first client node is authenticated to communicate over the first logical subinterface's dedicated network or subnetwork;
if the first client node is determined to be authenticated to communicate over the first logical subinterface's dedicated network or subnetwork, forwarding the received data packet over the first logical subinterface's dedicated network or subnetwork;
receiving a second data packet at the shared media port from a second client node;
associating the second received data packet with the first logical subinterface;
determining whether the second client node is authenticated to communicate over the first logical subinterface's dedicated network or subnetwork; and if the second client node is determined to not be authenticated to communicate over the first logical subinterface's dedicated network or subnetwork, preventing the second received data packet from being forwarded over the first logical subinterface's dedicated network or subnetwork, while still allowing data packets from the first client node to be forwarded if the first client node is determined to be authenticated.

25. An apparatus comprising:
a shared media port that is a physical interface and has a trusted subinterface configured to provide access to a trusted network or subnetwork and an untrusted subinterface configured to provide access to an untrusted network or subnetwork, wherein a subinterface is a logical division of a physical interface;
an authenticator configured to receive authentication requests from a plurality of client nodes and in response the authentication requests to independently assign to each of the plurality of client nodes an authentication state; and
a media access control (MAC) filter configured to maintain an entry for each client node indicating the authentication state of the client node and a MAC address of the client node, and in response to receipt of a data packet from a particular client node directed to the trusted subinterface, to index to an entry in the MAC filter based on a source MAC address of the data packet, to identify the authentication state of the particular client node stored in the indexed MAC-filter entry, and to determine whether the particular client node is authenticated to communicate over the trusted subinterface, and, if so, to permit the particular client node to access the trusted subinterface,
wherein the media access control (MAC) filter grants client nodes access on a client-by-client basis.

26. The apparatus of claim 25, wherein the media access control (MAC) filter is further configured to redirect the data packet from the particular client node directed to the trusted subinterface to the untrusted subinterface if the particular client node is not authenticated to communicate over the trusted subinterface.

27. The apparatus according to claim 25, wherein the trusted network or subnetwork is a virtual private network (VPN).

28. The apparatus according to claim 25, wherein the untrusted network or subnetwork is the Internet.

29. A method for implementing port-based network access control at a shared media port in an intermediate node, the shared media port being a physical interface coupled to a plurality of client nodes, the method comprising:
partitioning the shared media port into a plurality of logical subinterfaces by logically dividing the shared media port into subinterfaces, each logical subinterface dedicated to providing access to a different network or subnetwork accessible through the intermediate node;
receiving a data packet at the shared media port from a first client node;
associating the received data packet with a first logical subinterface in the plurality of logical subinterfaces;
determining whether the first client node is authenticated to communicate over the first logical subinterface's dedicated network or subnetwork; and if the first client node is determined to be authenticated to communicate over the first logical subinterface's dedicated network or subnetwork, forwarding the received data packet over the first logical subinterface's dedicated network or subnetwork.

30. The method according to claim 29, further comprising: performing at least one of dropping the received data packet or reclassifying the received data packet to a different logical subinterface, if the first client node is determined not to be authenticated to communicate over the first logical subinterface's dedicated network or subnetwork.

31. The method according to claim 29, wherein the first logical subinterface's dedicated network or subnetwork is a virtual private network (VPN).

32. The method according to claim 29, wherein a logical subinterface in the plurality of logical subinterfaces is dedicated to providing access to the Internet.

* * * * *

UNITED STATES PATENT AND TRADEMARK OFFICE
CERTIFICATE OF CORRECTION

PATENT NO. : 7,624,431 B2
APPLICATION NO. : 10/728302
DATED : November 24, 2009
INVENTOR(S) : Cox et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 855 days.

Signed and Sealed this

Twenty-first Day of December, 2010

David J. Kappos
*Director of the United States Patent and Trademark Office*